S. H. JAMES.
Bolt and Nut.

No. 197,473.              Patented Nov. 27, 1877.

Witnesses.                                Inventor.

UNITED STATES PATENT OFFICE.

SAMUEL H. JAMES, OF LYDDINGTON, NEAR UPPINGHAM, ENGLAND.

IMPROVEMENT IN BOLTS AND NUTS.

Specification forming part of Letters Patent No. 197,473, dated November 27, 1877; application filed March 16, 1877; patented in England, October 25, 1876.

*To all whom it may concern:*

Be it known that I, SAMUEL HUBBARD JAMES, of Lyddington, near Uppingham, in the county of Rutland, England, have invented certain Improvements in Screws, Bolts, and Nuts, of which the following is a specification:

My invention consists in a split or severed nut, made with an undercut or barbed screw-thread; and in the combination, with such a nut, of a bolt or screw having corresponding undercut screw-threads, all as hereinafter more particularly set forth.

Figure 1:
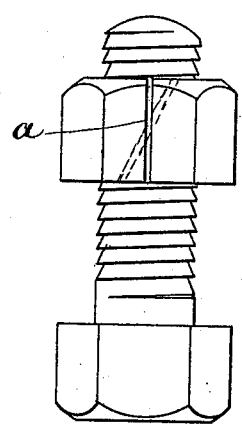
Figure 2:
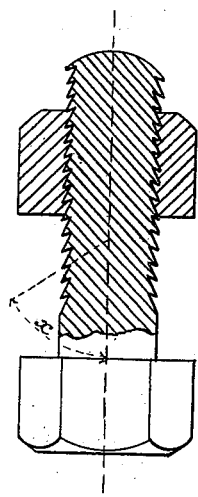
Figure 3:
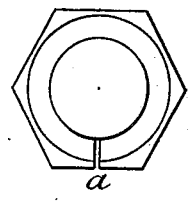

Figure 1 represents an elevation of a nut made in accordance with my invention, and applied to a bolt having an undercut thread. Fig. 2 is a section of the same, showing how the upper and lower sides of threads, both of the nut and of the bolt or screw, are inclined or deflected toward the head, the angle $x$ being acute, or less than a quadrant. Fig. 3 is a plan of the nut shown in Fig. 1, the same being made with one transverse slit, $a$, cut in a line parallel with its axis, as shown both in Figs. 1 and 3, or the slit may be inclined to such axis, as indicated by the dotted lines in Fig. 1.

The tendency of this bolt and nut, when strained one upon the other in use, is to increase the diameter of the male thread, and correspondingly to contract the nut-thread, as also to force increasing sections into decreasing grooves, thus augmenting the hold or gripe.

The object of slitting the nut at its side is that the act of screwing tight causes the slit to partially close, thereby compensating for any inaccuracy that may exist between the fit of the bolt and nut. It will thus be seen that there is a contracting and griping action performed by the split nut, which is impossible in an entire or non-severed nut, whatever may be the form of thread of such last-named nut or of its bolt. In other words, the severed nut when screwed tight contracts, and becomes somewhat reduced in its circumference, and the more it is then turned the more will its slit tend to close, and the more will the nut tend to bind or clasp the bolt, and when once tight vibration or jarring augments the hold.

It will thus be seen that the action of the split nut, by reason of its barbed thread, is just the opposite of that of any solid or sectional nut having an ordinary thread, for such last-named nuts, when tightened up, must always tend to expand and burst, and when used require a conical counter-sink in the plate, or a second nut outside the inner split one, to resist the bursting tendency.

I do not limit myself to any particular angle of deflection, or any particular form of thread, whether round, flat, or otherwise, provided they are undercut threads, and provided the nut be a split or severed one.

Instead of a single cut in the nut, as above referred to in Figs. 1 and 3, these nuts may be totally divided into two or more sections, and be still serviceable, for the character and action of the barbed threads are such that such parts or segments of a nut will hold their place upon the bolt or screw, because the barbs of the one interlock with those of the other, and because that side of the thread opposing the strain forms more or less of an acute angle with the direction of the strain, and pressure draws the nut-threads down and into the bolt-threads.

Figure 4:
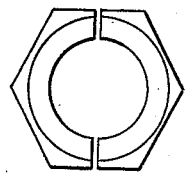

Fig. 4 illustrates one of these nuts totally divided into two equal parts.

I claim—

1. A split or severed nut, provided with undercut or barbed threads, substantially as shown and described.

2. The combination, with a split or severed nut having undercut or barbed threads, of an under-cut screw-threaded bolt or screw, substantially as shown and described.

S. H. JAMES.

Witnesses:
G. F. REDFERN,
W. H. AIMÉ.